Aug. 1, 1961  S. W. FLEMING  2,994,356
AUTOMOBILE PROTECTOR
Filed April 22, 1960
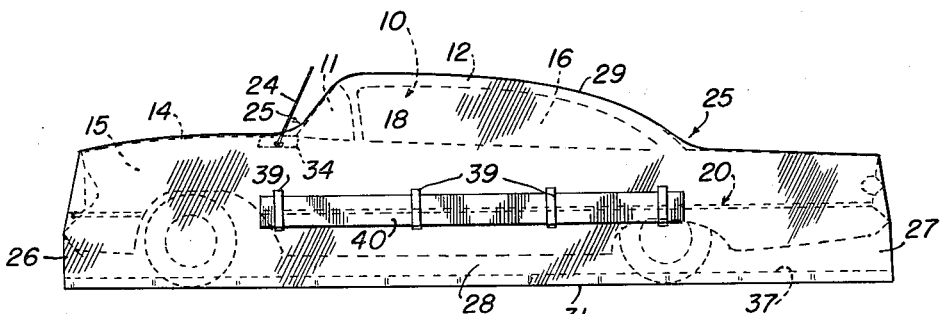
FIG. 1.
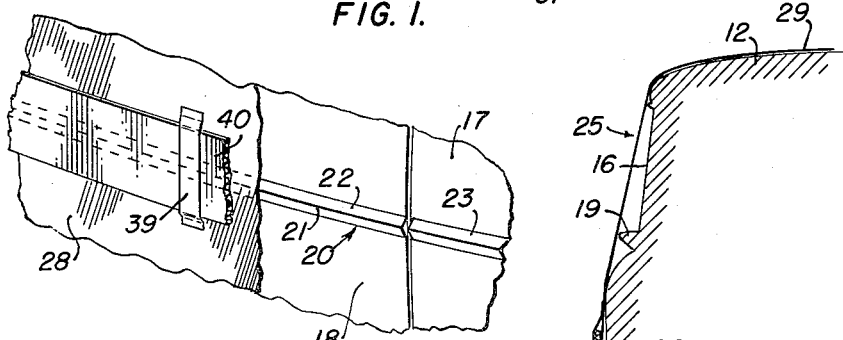
FIG. 2.
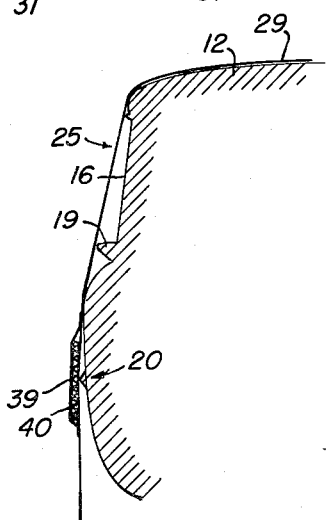
FIG. 4.
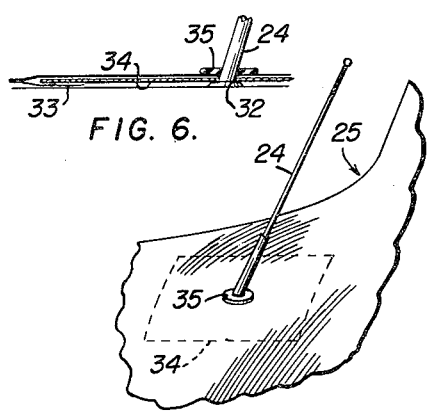
FIG. 6.
FIG. 3.
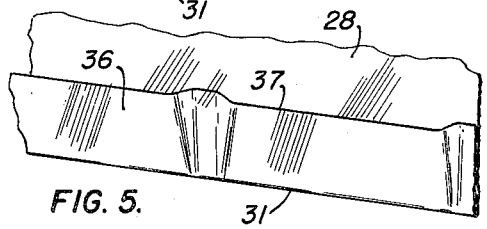
FIG. 5.
SAMUEL W. FLEMING
INVENTOR.
BY Herbert J. Brown
ATTORNEY

United States Patent Office 2,994,356
Patented Aug. 1, 1961

2,994,356
AUTOMOBILE PROTECTOR
Samuel W. Fleming, 2501 W. 7th, Fort Worth, Tex.
Filed Apr. 22, 1960, Ser. No. 24,096
1 Claim. (Cl. 150—52)

This invention relates to protective devices for automobiles and has reference to construction of and means for mounting scuff guards for the sides and doors of automobiles.

Although it is widely believed that franchised automobile dealers keep all their new cars on immaculate showroom floors, many cars are actually kept in outdoor storage for much of the time elapsing between their completion on a factory assembly line and their ultimate sale. Few dealers have adequate showroom space to display all models and variations of a given manufacturer's automobile, much less to house an adequate stock for replenishment of normal sales. When one considers the enclosed area required for modern service facilities the reason for outdoor storage of new automobiles becomes more easily understood. The storage problems faced by dealers in new automobiles are peculiar to the "factory new" status of the merchandise they handle and requires a standard of care not met by used car dealers or private car owners. In a competitive market, the purchaser of a new car usually expects and demands that his prospective acquisition be without the slightest defect in its exterior finish. Generally, customers give new cars an exhaustive inspection and detect blemishes which would go unnoticed were it not for possession of the car by a franchised dealer.

Since few dealers have space available to keep all models on a show room floor, automobiles in outdoor storage must frequently be shown to a buyer. The same buyer who demands repair of slight defects on the doors or side panels of an automobile he has selected, seldom takes note of the similar damage he inflicts upon other automobiles in the course of his selection. This form of damage results from the opening of doors of closely parked automobiles so that an opened door lightly strikes the door or body of an adjacent automobile. The side bumper strips provided on many modern automobiles are intended as protective devices for door panels, and though they serve their purpose well from a private owner's point of view, they are of little benefit to a dealer who must replace the strip itself once it is struck. If the surface of a storage area is uneven, bumper strips may even cause additional repair expense when a strip and door are damaged simultaneously.

The problem of protecting cars in storage from the enthusiasm of prospective buyers and the carelessness of employees has not been solved satisfactorily heretofore. Permanent protective railings constructed in a storage area do no necessarily prevent the damage and greatly reduce the storage capacity of the area. Rigid auxiliary bumpers tend to mar an exterior finish and restrict access to the interior of the car; auxiliary members also have a tendency to collect rain and dust and may result in conspicuous corrosion. In this connection, it should be noted that outdoor storage, as presently known, results in exposure of an automobile to the elements and requires frequent washing and polishing of stored automobiles to keep them in marketable condition; the use of suspending straps or adhesive tapes to mount guard members on the sides of an automobile results in uneven weathering and produces an irregular appearance in the exterior finish.

Accordingly, an object of the invention is to provide a scuff guard particularly adapted to protect and preserve the appearance of new cars in outdoor storage.

Another object of the invention is to provide a scuff guard which may be supported by the body of an automobile without direct attachment thereto.

A further object of the invention is to provide means for holding and aligning scuff guards in adjacence with the sides of an automobile and wherein such means may serve as a weather barrier and light filter for the body of the automobile.

Another object of the invention is to provide a scuff guard and a mounting therefor which will permit a prospective buyer to observe the colors and body styles of a number of cars parked on a storage lot.

A particular object of the invention is to provide a construction for scuff guards which will permit access to the interior of a car so protected without expensive or time consuming dismantling of the guard or mounting structure.

A particular object of the invention is to provide a scuff guard and mounting structure for automobiles which may be fabricated economically and stored compactly.

These and other objects will become apparent from the following description and the accompanying drawings, wherein:

FIGURE 1 is a side elevational view of a scuff guard and its mounting structure shown in mounted relationship to the body of an automobile.

FIGURE 2 is a partially fragmentary perspective view of a scuff guard held by its mounting structure adjacent the bumper strip of an automobile door.

FIGURE 3 is a fragmentary perspective view of the body of an automobile showing the engagement of a scuff guard supporting structure with a radio antenna.

FIGURE 4 is a transverse sectional view of a scuff guard at one side of an automobile.

FIGURE 5 is a fragmentary perspective view of the peripheral base of a mounting structure for a scuff guard as defined herein.

FIGURE 6 is a cross sectional view showing the engagement of a scuff guard supporting structure with a radio antenna.

In the drawing, an automobile generally designated by the numeral 10, is shown with current features of construction which include a contoured windshield 11 constituting the forward wall of an arcuate roof deck 12, and inclined rear window 13 terminating in the upper side of a generally horizontal extended rear deck, a forwardly sloping hood 14 which extends laterally to include fender members 15, recessed lateral sides 16 beneath the roof deck 12 and convexly curved side panels 17 and door panels 18 beneath recessed portions of the sides. Decorative flow panels or fins 19 projecting laterally outward from side panels and door panels are incorporated in the construction and may extend longitudinally from the front to the rear of the automobile. A side bumper strip 20 including a laterally projecting ridge 21 may be constructed as several strip members 22 and 23 attached in horizontal alignment with one another to side panels 17 and doors 18 of the automobile; typically, side bumper strips are chromium plated and are used for their decorative value as well as the functional purpose of absorbing the impact of doors from adjacently parked automobiles and, in so doing, protecting door panels and side panels from scratches or dents. A radio antenna 24 is shown projecting upwardly and rearwardly from the hood 14 of the automobile 10 at one side thereof near the front windshield 11.

Generally, the invention is directed to means for mounting and positioning protective strips of shock absorbing material such as corrugated board at opposite sides of an automobile while it is in storage. More particularly, a sheathing 25 formed from a thin sheet of thermo plastic material, such as polyethylene or vinyl acetate film, is constructed to conform generally to the exterior dimensions and contours of the automobile 10. The sheathing 25 includes substantially vertical forward, rear and lateral sides 26, 27 and 28 but the upper side 29 of the sheathing is made to conform with and fit adjacently to the roof deck 12, windshield 11, rear window 13, hood 14 and rear deck 30 of the automobile 10 so that longitudinal displacement of the sheathing with respect to the body of the car is inhibited and so that the styling characteristics of the automobile are not obscured. The sheathing is open at its lower side and a peripheral lower edge 31 extends to proximity with the ground. An opening 32 is provided through the upper side of the sheathing at a position thereon corresponding to the location of the automobile antenna 14. Beneath the opening 32 a rectangular strip 33 of thermo plastic film is bonded at three of its sides to the lower surface of the sheathing 25 and an opening corresponding to and aligned with the opening 32 in the sheathing is formed through the rectangular strip. A rectangular sheet of cardboard 34 is positioned adjacently between the rectangular strip 33 and the sheathing 25 and is also provided with an opening in alignment with but smaller in diameter than the openings respectively formed in the sheathing and rectangular strip. A flexible seal 35 formed as an annular member having an inside diameter less than the diameter of the base of the antenna 24 is positioned about the antenna and is forced into sealing contact with the upper surface of the sheathing 25. At the peripheral lower edge 31 of the sheathing 25 a plurality of interiorly opening pockets 36 are formed by turning an edge 37 of the sheathing film inwardly and upwardly within the sheathing 25 and bonding adjacent surfaces of the sheathing and the upwardly turned portion thereof at spaced locations about the peripheral lower edge. Weights 38 preferably constructed as padded bars or sand bags are placed within the pockets 36. A plurality of vertical straps 39 are bonded at their opposite ends to the exterior surface of the sheathing 25 at positions thereon adjacent the side bumper strips 20. The vertical straps 39 are substantially equal in length and are positioned in horizontal alignment with one another to receive one or more elongate strips 40 of corrugated board. The strips of corrugated board 40 which serve as scuff guard members extend longitudinally beyond the forwardmost and rearwardmost vertical straps 39 or a plurality of vertical straps and overlapping shorter strips (not shown) may be employed if so desired.

In use, the rectangular sheet of cardboard 34 is placed between the rectangular strip 33 of film material and the sheathing 25 and the openings in these members received the antenna 24 of the car. The seal 35 is then positioned about the base of the antenna 24 and is pressed downwardly against the sheathing 25 and the cardboard sheet 34 to hold the same against the hood 14 of the car 10 and the opening in the sheathing. The remainder of the sheathing 25 is then lowered about the automobile 10 and weights 38 are placed within the pockets 36 at the lower peripheral edge 31 of the sheathing. The sheet of cardboard 34 resists both lateral and longitudinal displacement of the sheathing 25 on the automobile 10 and distributes the load of displacement stresses about the bonded junction of the rectangular strip of film 33 to the sheathing; hence, the opening in the sheathing is not enlarged or torn by such forces. The cardboard sheet 34 may also serve as a specification or price sheet for the automobile. The corrugated board strips 40 which serve as scuff guard members are positioned and held by the vertical straps 39 to receive and absorb an impact from the door of an adjacently parked automobile. The weight of the corrugated board strips 40 is evenly distributed over the top of the car and does not tend, with itme or motion, to erode any particular part thereof. Since the sheathing 25 encloses the automobile it serves not only as an advantageous supporting structure for the scuff guards but also protects the body of the car from wind and rain and thereby preserves the appearance of the car's exterior finish; dies or pigments may also be incorporated in the film material to filter sunlight and further inhibit paint deterioration. Access to the interior of the car may be gained by raising the lower peripheral edge 31 of the sheathing 28 at one of the car doors 18 and opening the door therebeneath. The transparency of polyethylene and vinyl acetate films permits a car to be maneuvered without removal of the sheathing 25 although precautions to provide necessary ventilation and to prevent the accumulation of exhaust gasses are necessary.

The invention is not limited to the exemplary construction herein shown and described, but may be made in various ways within the scope of the appended claim.

What is claimed is:

For an automombile, a side protector comprising: a sheathing of flexible film material conforming in shape to the body of an automobile and having a peripheral lower edge in proximity with the ground, a plurality of vertical straps spaced from and horizontally aligned with one another and having their opposite ends secured to said sheathing at the sides of said automobile, an elongate pad received and supported by said straps, pockets attached to said sheathing at said lower peripheral edge of said sheathing, and weights removably received in said pockets.

References Cited in the file of this patent

UNITED STATES PATENTS

| 1,356,541 | McGregor | Oct. 26, 1920 |
| 2,734,765 | Henderson | Feb. 14, 1956 |

FOREIGN PATENTS

| 511,796 | Italy | Jan. 27, 1955 |